US008873655B2

(12) United States Patent
Rao et al.

(10) Patent No.: US 8,873,655 B2
(45) Date of Patent: Oct. 28, 2014

(54) SENDING INFORMATION AT A BAND EDGE WITHIN AN ORTHOGONAL FREQUENCY-DIVISION MULTIPLEXING (OFDM) SYMBOL

(71) Applicant: Intel Corporation, Santa Clara, CA (US)

(72) Inventors: Bhaskar Rao, San Diego, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/738,928

(22) Filed: Jan. 10, 2013

(65) Prior Publication Data

US 2014/0192848 A1   Jul. 10, 2014

(51) Int. Cl.
H04K 1/10 (2006.01)
H04L 27/28 (2006.01)
H04L 27/26 (2006.01)
H04L 5/00 (2006.01)

(52) U.S. Cl.
CPC ............ H04L 27/2626 (2013.01); H04L 5/00 (2013.01)
USPC .......................................... 375/260; 375/259

(58) Field of Classification Search
CPC ............................. H04L 5/00; H04L 27/2626
USPC ............................................................ 375/260
See application file for complete search history.

(56) References Cited

U.S. PATENT DOCUMENTS

| 8,000,417 | B1 | 8/2011 | Zhidkov et al. |
| 2010/0220797 | A1 | 9/2010 | Namba et al. |
| 2010/0226458 | A1 | 9/2010 | Dent et al. |
| 2011/0038435 | A1 | 2/2011 | Omidi et al. |
| 2011/0080983 | A1 | 4/2011 | Popoli et al. |

FOREIGN PATENT DOCUMENTS

WO        2014/109948 A1      7/2014

OTHER PUBLICATIONS

International Search Report and Written Opinion received for PCT Patent Application No. PCT/US2014/010126, mailed on Apr. 18, 2014, 14 pages.

Primary Examiner — Erin File
(74) Attorney, Agent, or Firm — Thorpe North & Western LLP

(57) ABSTRACT

Technology is discussed for increasing the spectral efficiency of an Orthogonal Frequency-Division Multiplexing (OFDM) symbol. Spectral efficiency can be increased by adding information to a band edge of the OFDM symbol in connection with measures taken to reduce OOB spectral leakage from the OFDM symbol. Spectral leakage reduction measures can include application of a tapering window to at least a portion of OFDM data in the time domain to reduce power in sidelobes in the frequency domain. In some examples, such measures can comprise reducing transmission power at certain frequencies for a set of adjacent sub-carriers within the OFDM symbol at or near the band edge of the OFDM symbol. The additional bandwidth at the OFDM symbol can be used for many different applications, such as, without limitation, Device-to-Device (D2D) communication and/or Machine-to-Machine (M2M) communication.

19 Claims, 9 Drawing Sheets

SENDING INFORMATION AT A BAND EDGE WITHIN AN ORTHOGONAL FREQUENCY-DIVISION MULTIPLEXING (OFDM) SYMBOL

BACKGROUND

With respect to wireless communications, the basic underlying physical resource is radio spectrum. Although small spans of additional radio spectrum have become available for wireless communication systems, such as Wireless Wide Area Networks (WWANs), ultimately radio spectrum is a limited resource. Efficient use of the available radio spectrum, therefore, is one key to dealing with the continually increasing demands placed on WWANs.

Increasing spectral efficiency within the context of WWANs can involve special considerations. For example, the mobile radio channels associated with WWANs can be highly time-variant and dispersive. The time varying and dispersive nature of such channels can be addressed in part by multicarrier modulation. Multicarrier modulation can be inefficient due to the application of guard bands between carriers to avoid Inter-Carrier Interference (ICI).

Currently, gains are being made with respect to spectral efficiency in WWANs through the use of Orthogonal Frequency Division Multiplexing (OFDM). By setting the various subcarriers of a multi-carrier WWAN at harmonic frequencies, they can be made orthogonal one to another. As a result, guard bands between sub-carriers can be omitted and sub carriers can even overlap with respect to frequency. Implementation of OFDM in WWANs, such as those consistent with the Third Generation Partnership Project (3GPP) Long Term Evolution (LTE) standards, has allowed important gains to be made with respect to spectral efficiency. However, important gains remain to be made with respect to spectral efficiency not only by means of additional technologies, but by improving the spectral efficiency of OFDM implementations themselves.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
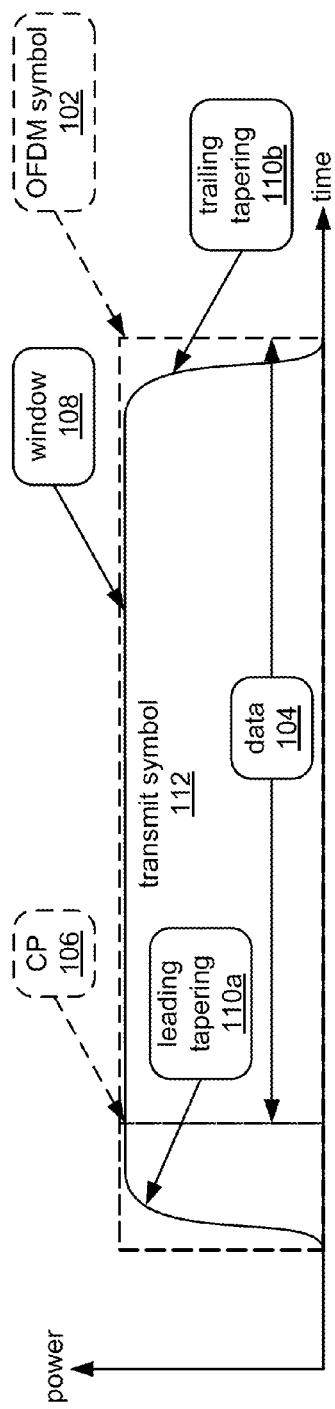
FIG. 1A is a block diagram illustrating the combined data and Cyclic Prefix (CP) portions of a transmit Orthogonal Frequency-Division Multiplexing (OFDM) symbol with respect to time, together with a substantially rectangular filtering window applied after the appendage of the CP.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As an important statement of the generality of examples discussed in this disclosure, while the terminology of the Third Generation Partnership Project (3GPP) Long Term Evolution (LTE) standard is often used throughout this specification, it is not intended to be limiting, and there are exceptions in the use of more general terminology in portions of this specification to further communicate this point.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology, nor is it intended to limit the scope of the claimed subject matter.

The application of Orthogonal Frequency Division Multiplexing (OFDM) contributes to increased spectral efficiency by allowing guard bands to be removed between carriers, such as sub-carriers, in a multi-carrier Wireless Wide Area Network (WWAN). However, the composite OFDM symbol, comprising symbols from the various sub-carriers, traditionally employs guard bands to prevent Out-Of-Band (OOB) radiation. In the time domain, the composite OFDM symbol has typically been windowed by a substantially rectangular function. Where a Cyclic Prefix (CP) is added to the data within the OFDM symbol, the window can be substantially rectangular so the transition duration in the ramp up and down period can be less than the CP time to avoid Inter-Carrier Interference (ICI).

Figure 3:
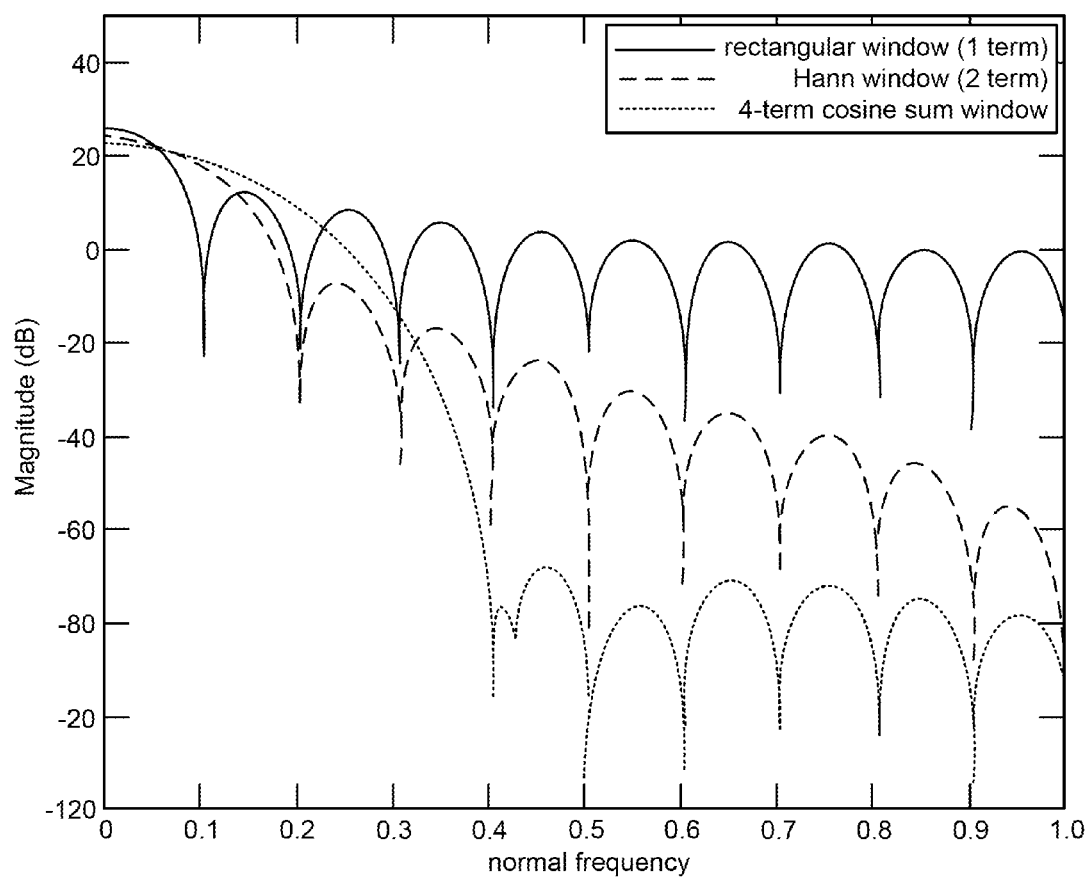
FIG. 3 provides a graph of the main lobe and side lobes generated in the frequency domain from the rectangular window traditionally applied to an OFDM symbol in the time domain, as compared to the main lobes and side lobes for alternative windowing types applied before application of the CP, consistent with various examples.

As can be appreciated, the substantially rectangular OFDM symbol in the time domain results, substantially, in a sin c function in the frequency domain, with a main lobe and side lobes. Unfortunately, the high side-lobes of the rectangular window can be a key contributor to the out of band (OOB) leakage. With respect to such a sin c function, as depicted in FIG. 3 below, the first main side-lobe can be only around −13 decibels (dB) down compared to the main-lobe. To prevent OOB leakage from side lobes with such high power levels, guard bands are traditionally applied on each edge of the OFDM symbol band, as is currently the case in Third Generation Partnership Project (3GPP) Long Term Evolution (LTE) standard Rel. 8, 9 and 10. Guard bands at the edges of OFDM symbol bands can result in a significant reduction to spectral efficiency. For example, in the current 3GPP LTE standards, guard bands result in about a 10% loss of bandwidth.

The bandwidths lost to guard bands could provide significant communication resources, improving spectral efficiency, as long as the OOB radiation can be properly controlled and other scheduled transmissions are not compromised. For example, with the proper innovations, portions of bandwidth at OFDM symbol band edges, presently occupied by guard bands, can be employed for Device-to-Device (D2D) and/or Machine-to-Machine (M2M) communications. D2D and M2M communications typically involve the wireless communication of relatively small amounts of data. Therefore, D2D and M2M communications may be transmitted with relatively small improvements made by reducing a width of the guard bands. To avoid compromising other scheduled transmissions, a CP can be preserved.

Several examples are discussed below of innovations capable of sending information at band edges within an OFDM symbol. Generally, examples can involve reducing spectral leakage from an inbound region of an OFDM signal into a guard band of the OFDM symbol. Additional information can be provisioned to at the edge of the OFDM symbol. In some examples, this additional information can occupy portions of the OFDM symbol previously reserved for guard bands.

For example, a device can be provided at a transmitter within a WWAN system with a windowing module that can be used to reduce OOB spectral leakage. The windowing module can be configured to apply any one of several different types of tapering windows in the time domain to an OFDM symbol, other than a rectangular window. A tapering window, throughout this application, can refer to any window with rounded edges, such as, by way of example and not limitation, a Hamming window, a Hann window, or a raised cosine window.

Such alternative, tapering windows can reduce side lobes, particularly the first main side lobes in the frequency domain to prevent OOB leakage and reduce the need for guard bands. The tapering window can be applied before the CP. Where the tapering window is applied before the CP, a steep ramp time associated with a substantially rectangular function can be avoided. Where the tapering window is applied after the CP, a more gradual slope of the ramp associated with a tapered window could truncate the CP, preventing the CP from performing its function in avoiding ICI.

A data module can also be provided with the device to provision information to the OFDM symbol at one or more of its band edges. This information can occupy bandwidth previously unavailable due to the utilization of guard bands. A portion of such bandwidth can be made available due to the decreased power in the frequency domain side lobes as a result of the tapering window. A transmission module can further be provided with the device, to prepare and/or transmit the OFDM symbol with the additional information in the band edge, after application of the tapering window.

In some examples, application of a tapering window can result in a broadening of the main lobe in the frequency domain. The broadening of the main lobe in the frequency domain can result in a broadening of sub-carriers. Although orthogonality between the sub-carriers can be preserved between most sub-carriers despite the broadening of the main lobe, orthogonality can be lost between the adjacent sub-carriers.

In such examples, a small tradeoff can be made between complexity and bandwidth. Namely, a relatively small amount of equalization complexity can be accepted in exchange for additional frequency bandwidth. The equalization process can be implemented at a transmitter and/or a receiver. At transmitter, the transmitter can select ICI coefficient information corresponding to a particular tapering window applied in the time domain by the transmitter. The ICI coefficient information can be known a-priori for the particular tapering window applied. The ICI coefficient information can then be provisioned to a receiving device so that it can equalize an OFDM signal by removing ICI in adjacent sub-carriers.

Some examples can comprise transmitting an OFDM symbol at different powers with respect to frequency to reduce OOB spectral leakage. For example data in a central span of the OFDM symbol can be transmitted at a first, relatively-high power range. Data at the edges of the OFDM symbol, with respect to frequency, can be transmitted at relatively lower powers. Multiple different power levels can be applied, some pertaining to sub-carriers within an inbound region of the OFDM symbol, and some pertaining to portions of the bandwidth outside the inbound region and previously reserved for guard bands.

FIG. 1A depicts general contours of an OFDM symbol 102 with respect to time. Although amplitude within an actual OFDM symbol can vary with respect to time, the general contour depicted can be interpreted in terms of potential maximum amplitude values. The OFDM symbol can comprise data 104 and a Cyclic Prefix (CP) 106. Consistent with the 3GPP LTE standards, the CP, which can provide a set of duplicated samples from the tail end of the data, can be added to the front of the OFDM symbol. Throughout this application, the term "OFDM symbol" can refer to both data from the OFDM symbol and the appended CP. The CP can avoid Inter-Symbol Interference (ISI) inasmuch as the duplicated portion from the end of the data in the OFDM symbol can compensate for overlap between symbols.

As can be appreciated, the substantially rectangular OFDM symbol in the time domain results, substantially, in a sin c function in the frequency domain, with a main lobe and side lobes. Unfortunately, the high frequency-domain side-lobes of the rectangular time-domain window can be a key contributor to the out of band (OOB) leakage. With respect to such a sin c function, the first main side-lobe can be just around −13 decibels (dB) down compared to the main-lobe. In an effort to mitigate the OOB leakage in these side-lobes, a traditional time-domain window filter 108 can be applied after cyclically appending the CP 106. However, the nature of this time-domain window can be significantly constrained in ways that significantly mitigate reductions to side-lobe power levels.

To preserve the benefits of the CP 106 with respect to ISI, the traditional time-domain window filter 108 quickly ramps to unity. Otherwise, the CP could become too truncated to serve its purpose. For example, if the ramp time is greater than the CP time, ISI can result.

Therefore, the lead tapering 110a, with respect to time, of the traditional, time-domain window filter can be very steep. The symmetrical nature of such a filter can also result in a trailing tapering 110b, with respect to time, that is also very steep. Therefore, although the traditional, time-domain window filter 108 can serve to round the edges of the resultant transmit symbol 112, the reductions to side-lobes in the frequency domain, and hence the reduction to spectral leakage, can be minimal. Therefore, additional measures have been traditionally applied to avoid OOB spectral leakage. Such measures can involve reserving sub-carriers at frequency edges of an OFDM symbol band on which data is not transmitted.

Figure 1B:
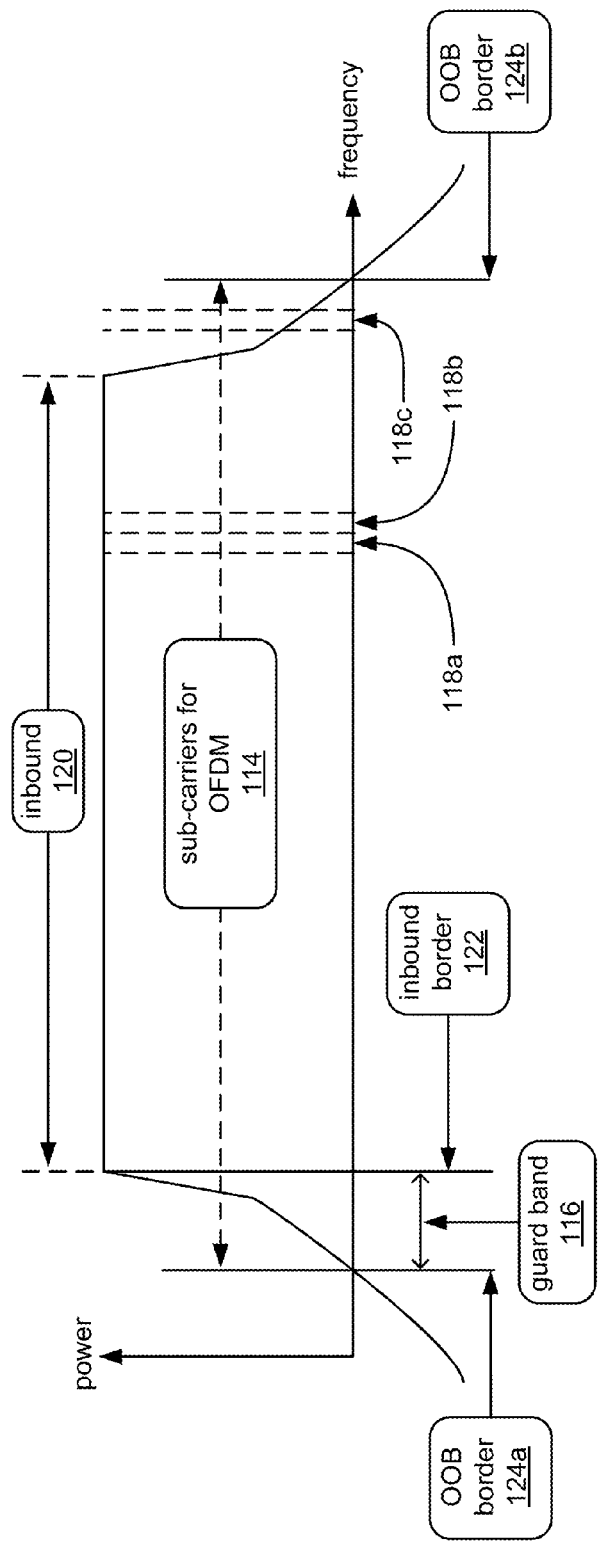
FIG. 1B is a block diagram illustrating combined spans of sub-carriers on which data can be transmitted and sub-carriers reserved for guard bands with respect to frequency before a Fourier transform is applied to create a time domain representation of the transmit OFDM symbol provided in FIG. 1A.

FIG. 1B depicts a span of sub-carriers 114 across a range of frequencies on which data for the transmit OFDM symbol 112 in FIG. 1A can be provided and which can be reserved for one or more guard bands 116 in which data is not transmitted. The span of sub-carriers can represent the sub-carriers before a Fourier transform, such as a Fast Fourier Transform (FFT), is applied to create the frequency domain representation of the transmit OFDM symbol 112 in FIG. 1A. The span of sub-carriers, of which a first sub-carrier 118a, a second sub-carrier 118b, and a third sub-carrier 118c are depicted, can comprise any number of sub-carriers allocated with respect to differing frequencies. For example, and not by way of limitation, support can be provided in the 3GPP LTE standards for 72, 180, 300, 600, 900, and 1,200 sub-carriers.

Sub-carriers 118a, 118b carrying data can be disposed within an inbound region 120 of the span of sub-carriers 114. At either edge of the span of sub-carriers, a guard band 116 can be disposed, between an inbound border 122 and an OOB border 124a, 124b. A guard band can comprise any number of sub-carriers. However, data can be omitted from sub-carriers, such as sub-carrier 116c, outside of the inbound region and potentially in a guard band.

The reserved bandwidth in the guard bands 116 can be used to provide a buffer zone that can be occupied by relatively high first side-lobes of a sin c function in the frequency domain due to the substantially rectangular nature of the OFDM transmit symbol 112 in the time domain. However, to insure that power in the side-lobes has been sufficiently reduced before an OOB boundary, the guard bands must be sufficiently large, occupying a sufficient number of sub-carriers on which data cannot be transmitted. The size of such guard bands can significantly reduce the amount of bandwidth that can be used for data transmission and reduce spectral efficiency.

For example, in the current 3GPP LTE standards, guard bands can result in about a 10% loss of bandwidth. Since the maximum bandwidth for an OFDM symbol can be 20 MHz, 2 MHz of bandwidth can be lost to guard bands. Considering that Release 8 of the 3GPP LTE standards defines transmission bandwidths for 1.4 MHZ, bandwidth waste as great as 2 MHz is significant. The same is true of other guard band bandwidths.

As long as the OOB radiation is properly controlled and other scheduled transmissions are not compromised, the bandwidths lost to guard bands 116 could afford significant communication resources, improving spectral efficiency. Control of OOB radiation can involve preventing spectral leakage of significant power levels without the use of guard bands, or with reduced guard bands. With less bandwidth reserved for guard bands, additional information can be communicated at the edges of OFDM symbols. New techniques for controlling spectral leakage, however, can avoid ISI by preserving CP structures. New approaches to controlling spectral leakage under these constraints can be discussed with respect to the following figure.

Figure 2:
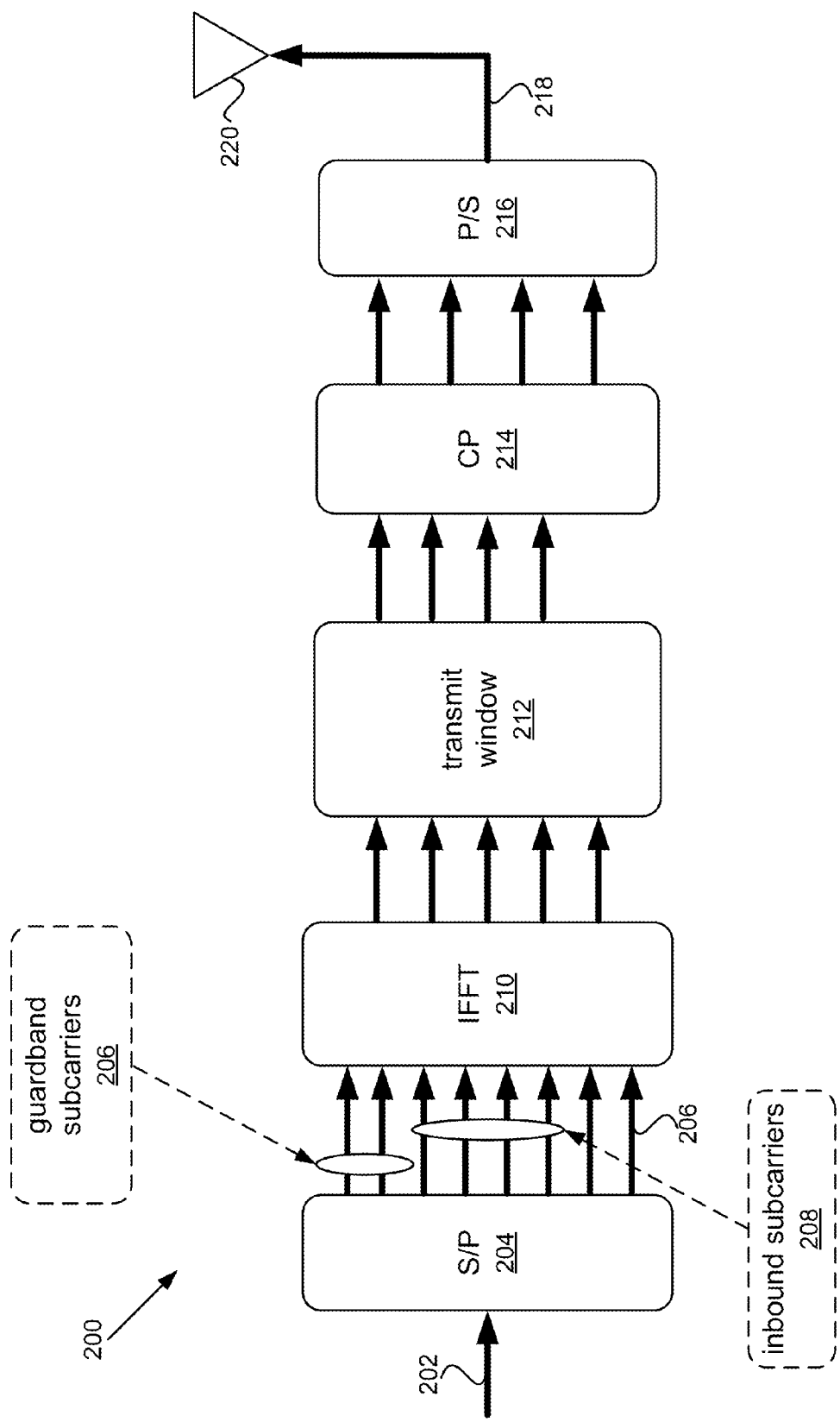
FIG. 2 is a block diagram illustrating an architecture for a transmitter design for the production and/or transmission of OFDM symbols, where a time-domain window can be applied before the application of the CP, consistent with various examples.

FIG. 2 depicts an architecture for a transmitter design 200 for the production and/or transmission of OFDM symbols. Although various functional blocks can be added or removed, the transmitter depicted in FIG. 2 is consistent with a transmitter under the 3GPP LTE standards. A data stream 202 is depicted. The data stream can carry data embedded in a Modulation and Coding Scheme (MCS). The data stream can be converted from a single data stream to parallel data streams by a Single-to-Parallel converter 204. Parallel data streams can be mapped to different sub-carriers by a mapping block (not depicted).

Certain sub-carriers 206 near the edges of a span of frequencies allocated for an OFDM symbol can be reserved for guard bands. Data can be mapped to the remaining sub-carriers, designated as inbound sub-carriers 208. An inverse Fourier transform, such as, without limitation, an IFFT, can then be performed by a transform block 210. The output of the inverse Fourier transform places the data in the time domain.

In the time domain, a new, time-domain window can be applied by a transmit window block 212. The new, time-domain window can be applied before the application of the CP by the application of the CP block 214. As can be appreciated, the new, time-domain window, which can be referred to herein as a tapering window, is distinct from the traditional time-domain window filter 108, which is discussed above with respect to FIG. 1A and which is applied before the CP. Throughout this application, a tapering window can refer to any window with rounded edges. Examples provided by way of illustration, and not limitation, can include a Hamming window, a Hann window, or a raised cosine window. Many other windows known to those of ordinary skill in the art, such as a Bartlett window, can be used as a tapering window.

In some examples, the tapering window can be applied to the sub-carriers at the band edge of an OFDM symbol. Conversely, the time domain signal of the center sub-carriers can be weighted by a window that is closer to a rectangular window, which has a flat top in the middle. Since the OFDM symbol consists of multiple sub-carriers, the tapering window can be said to be applied to at least a part of the OFDM symbol.

After application of the tapering window and, then, after application of the CP, a Parallel-to-Single converter 216 can be used to combine the various time domain data streams to a single transmit signal 218 for transmission on one or more transmitter antennas 220. The transmitter 200 can comprise any type of a WWAN transmitter, such as a transmitter at an evolved Node B (eNodeB) or at a Uniform Equipment (UE). Throughout this application, the term "eNodeB" can be interchangeable with any other type of substantially stationary transmission point in a wireless communication system, such as a Base Station. Additionally, the term "eNodeB" can refer to a MaCro-Node (MCN) eNode B or a Low Power Node (LPN). An LPN can comprise one of one of a micro cell, a pico cell, a femto cell, a home eNodeB cell (HeNB), a Remote Radio Head (RRH), a Remote Radio Equipment (RRE), a repeater, or another type of transmission point having a lower power than is typically used at an MCN. Where the transmitter is located at an eNodeB, the transmitter device can include additional functional blocks consistent with Orthogonal Frequency Domain Multiple Access (OFDMA) forms of OFDM. Where the transmitter is located at a UE, the transmitter device can include additional functional blocks consistent with Single-Carrier Frequency Domain Multiple Access (SC-FDMA).

Since the tapering window is applied by the transmit window block 212 before application of the CP by the CP block 214, the CP can fulfill its function of avoiding ISI. Also, due to the significant rounding of the edges of the OFDM data, the spectral leakage outside of the frequencies allocated for the inbound sub-carriers can be reduced significantly. The reduction in the spectral leakage at the band edges of the OFDM can be sufficient to open sub-carriers previously reserved as guard band sub-carriers 206 to carry data. Therefore, a data module can provision information to the sub-carriers 206 previously reserved for one or more guard bands 216. The achievable reductions in spectral leakage can be explained with respect to FIG. 3.

FIG. 3 graphs the main lobe and side lobes generated in the frequency domain from a rectangular window, as substantially applied to an OFDM symbol in the time domain according to traditional approaches. Graphs are also provided, for the sake of comparison, as compared to the main lobes and side lobes for alternative windowing types, consistent with various examples. The vertical axis for the graphs measures a relative magnitude in decibels. The horizontal axis is measured with respect to normalized frequency, expressed in units of cycles (or radians) per sample as "$x*\pi$ radians/sample," where "x" corresponds to the values reported across the horizontal axis.

The solid line graphs the frequency response of a rectangular or substantially rectangular window. The logarithmic nature of the graph can explain the variation from a traditional representation of a sin c function. As can be appreciated from the graph, the first side lobe is only about 13 dBs lower than the main lobe. Additionally, the additional orders of side lobes trail off at a relatively slow rate. Therefore, the power in these side lobes can result in significant OOB leakage.

Conversely, the side lobes for the other two windowing types have significantly reduced power with respect to their main lobes. For example, with respect to the Hann window, denoted by the dashed line, a drop off of about 30 dB occurs between the main lobe and the first side lobe. As can be appreciated, a signal with one thousandth of the power of the original signal power is not as much of a concern with respect to spectral leakage. Even more impressive is the close to 90 dB drop to the first major side lobe in relation to the main lobe with respect to the 4-term cosine window, depicted by the dashed line. As can be appreciated, additional types of tapered windows can be applied in the time domain with similar results in their frequency response.

In addition to the reduced side lobes for the two alternative windowing functions depicted in FIG. 3, a second distinguishing characteristic with respect to the rectangular window can be appreciated. Although more dramatic with respect to the 4-term cosine window, the main lobe of both the Hann window and the 4-term cosine window are broadened with respect to normalized frequency. More specifically, the main lobe of the Hann window is increased by about a factor of two and that of the 4-term cosine window is increased by a factor of four. In a sense, the reduction of the side lobes is purchased with a broadening of the main lobe.

The broadened main lobe can have implications for Inter-Carrier Interference (ICI). Although the broadened main lobes can leave the orthogonality of most sub-carriers unaffected, this is not true of all sub-carriers. The broadened main lobes can mitigate the orthogonality of adjacent sub-carriers. Consequently, the larger main lobes of alternative, tapered windowing functions can lead to ICI between adjacent sub-carriers.

However, the potential ICI that could result from the broadened main lobes would be introduced in a highly controlled manner. The ICI that would be introduced would be limited. Furthermore, the ICI that would be introduced could be known beforehand as a function of the type of windowing function responsible for its introduction. Since the frequency responses of the various alternative tapering windows are known, the ICI that they introduce can be removed by a simple equalization process.

Each of these alternative tapering windows has a known ICI coefficient. For example, the ICI coefficient for a Hann window is 0.2. This ICI coefficient for a Hann window can be read from the graph for the Hann window (dashed line) in FIG. 3, where the first null occurs at a normalized frequency value of 0.2. A similar ICI coefficient can be read for the 4-term cosine window, resulting in a value of 0.4.

Since the channel responses can be almost identical across a sub-carrier and an adjacent sub-carrier on either side, occupying similar frequencies, this ICI coefficient can be used to almost completely remove any ICI introduced. For example, the Hann window doubles the main lobe and so introduces ICI between one of its left/right neighbors only. Because equalization can be performed at a receiver simply by applying an ICI coefficient, as discussed in greater detail below, the equalization process involves a small increase in complexity, especially when compared to the much more complicated equalization process already involved with Code Division Multiple Access (CDMA) and Global System for Mobile Communications (GSM) standards.

Additionally, or in the alternative, the known frequency responses of various tapered windows that can be applied provide another approach for avoiding ICI. Because the factor by which a main beam is increased for an alternative tapered window relative to the main beam from a rectangular window, the distance between data carrying sub-carriers can be adjusted accordingly. Although the subcarrier spacing can remain the same, data can be sent on alternating subcarriers, where no data is sent on skipped subcarriers.

For example, since the Hann window doubles the main lobe, it can introduce ICI between its neighbor on the left and right with respect to spectrum values. Hence, ICI can be illuminated by alternating between sub-carriers when allocating data. A similar process can be applied with respect to every fourth sub-carrier for the 4-term cosine window.

Therefore, the known nature of the frequency response of various possible alternative tapered windows allows ICI to be introduced in controlled ways that can make the ICI removable. Removal of the ICI can be performed by a receiver through a relatively simple equalization process, which introduces little complexity. Additionally, ICI can be eliminated by alternating between sub-carriers that carry data and those that do not, but at a cost to throughput. By introducing the removable ICI, additional bandwidth can be recovered from the edges of the OFDM symbol because of the accompanying reduced side-lobes.

Figure 4:
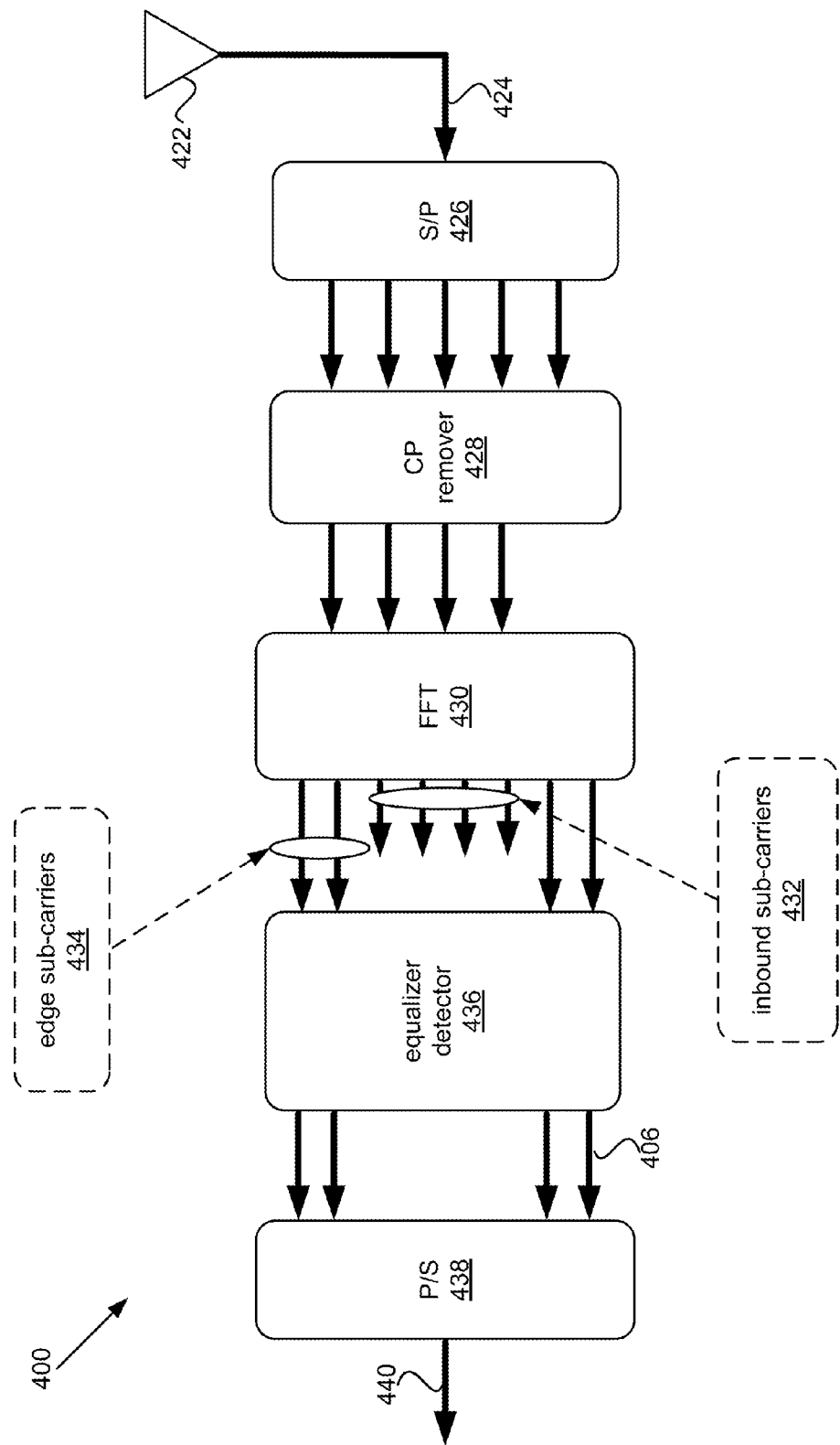
FIG. 4 is a block diagram illustrating an architecture for a receiver design for the reception and/or decoding of additional information that has been transmitted at OFDM band edges, consistent with various examples.

In accordance with one embodiment of the present invention, FIG. 4 depicts an architecture for a receiver design 400 for the reception and/or decoding of OFDM symbols. The design allows for the reception and decoding of additional information that has been transmitted at OFDM band edges. Although various functional blocks can be added or removed, the receiver depicted in FIG. 4 can be consistent with a receiver under the 3GPP LTE standards, such as a UE or an eNodeB. Where the receiver is located at a UE, the receiver can include additional functional blocks consistent with reception and/or decoding of Orthogonal Frequency Domain Multiple Access (OFDMA) forms of OFDM received in a downlink from a Radio Access Network (RAN). Where the receiver is located at an eNodeB or other type of low power node, the receiver can include additional functional blocks consistent with Single-Carrier Frequency Domain Multiple Access (SC-FDMA) reception and/or decoding of signals received in an uplink from a User Equipment (UE). Throughout this application, "UE" can refereed to any type of mobile device and or station, and can be configured for transmission and/or reception between itself, any type of transmission point, such as any type of eNodeB, other UEs and/or any other type of wireless communication device.

One or more antennas 422 can receive an OFDM symbol 424. A Single-to-Parallel converter 426 can break out several parallel time-domain samples from the OFDM symbol. The CP remover 428 can then remove several of these time-domain samples corresponding to a CP. The remaining data bearing time-domain samples can then be fed to a transform block 430. The transform block can perform a Fourier transform, such as, without limitation, a Fast Fourier Transform (FFT) on the remaining time-domain symbols. The output of the Fourier transform places the data in the frequency domain, as recoverable sub-carriers.

The recoverable sub-carriers from the Fourier transform block 430 can correspond to inbound sub-carriers 432 and to edge sub-carriers 434. Due to OOB leakage prevention measures, as described herein, one or more of the sub-carriers that would have previously been reserved for a guard band, or that would simply have been located near an edge of the OFDM symbol with respect to frequency, can carry additional data/information. In the frequency domain, equalization can be performed by the equalizer/detector block 436 to recover modulated sub-carriers from the recoverable sub-carriers.

In some examples, both inbound sub-carriers and edge sub-carriers can be equalized by the equalizer/detector module 436. In some examples, the equalizer/detector module 436 can apply a common equalization process to the inbound sub-carriers 432 and to edge sub-carriers 434. In certain examples, the equalizer/detector module can apply different equalization processes to the inbound sub-carriers and edge sub-carriers 434. In accordance with some examples, the inbound sub-carriers and edge sub-carriers can be diverted to different equalizer/detector modules (not depicted). In certain examples, an equalization process may not be applied to the inbound sub-carriers, the edge sub-carriers, or both of them, such as examples where ICI is eliminated by restricting data to alternating sub-carriers.

The equalizer/detector block 436 can apply ICI coefficient information to remove the controlled ICI that can be introduced through the application of a tapered window before addition of the CP by the transmitter. As described above with respect to FIG. 3, although the application of a tapered window before the application of a CP can free up sub-carriers at the edges of an OFDM symbol for data transmission, such windows can also spread energy from the transmission in one sub-carrier into adjacent sub-carriers. Therefore, a channel matrix in the frequency domain, which would otherwise be diagonal, takes on off-diagonal elements.

Each off diagonal element in the channel matrix can account for energy from an adjacent sub-carrier to the sub-carrier to which the diagonal element corresponds. For example, since the Hann window, increases the width of the main lobe by a factor of two, energy from a given sub-carrier can bleed into a sub-carrier immediately to the left and a sub-carrier immediately to the right of the given sub-carrier. Hence, what substantially would have been a diagonal matrix before the application of the Hann window can become a tri-diagonal matrix.

The OFDM signal, as received at the receiver and in the frequency domain after performance of a Fourier transform, can be represented by the product of this channel matrix and a vector of modulated sub-carriers from the transmitter, to which Gaussian white noise can be added. Therefore, the object of the equalizer/detector block 436 can simply be to remove impacts on the modulated sub-carriers from the off-diagonal elements from the channel matrix. In some examples, this can be achieved by simply multiplying a vector of multiple recoverable sub-carriers from the Fourier transform block 430 by the inverse of a reconstructed version of the channel matrix at the equalizer/detector block 436.

The off-diagonal elements for a reconstructed version of a channel matrix can be supplied by one or more units of ICI coefficient information. As explained, this ICI coefficient information can be known a-priori by the transmitter and indexed to the given tapered window type applied by the transmitter. Therefore, the transmitter can communicate the ICI coefficient information to the receiver to allow the receiver to apply the ICI coefficient information during equalization.

In embodiments consistent with the 3GPP LTE standards, the ICI coefficient information can be communicated from an eNodeB to a UE over one of Layer 1 (L1), Layer 2 (L2), and Layer (3) signaling. L3 signalling can include Radio Resource Control (RRC) signaling. In certain examples, the receiver can be pre-configured to apply certain ICI coefficient information. In some such examples, the ICI coefficient information to be applied by the receiver can be communicated to the transmitter so that the transmitter can select the corresponding tapered window to apply to its transmissions.

In some examples, diagonal elements of the reconstructed version of the channel matrix can simply have unitary values. In certain examples, these diagonal elements can be filled in with values obtained from channel estimation techniques, such as the use of Reference Signals. Alternative approaches to equalization can also be used. For example, time domain equalization approaches can be applied.

Once the vector of multiple recoverable sub-carriers is multiplied by the inverse of the reconstructed version of the channel matrix at the equalizer/detector block 436, the parallel modulated sub-carriers can be combined into a single output 440 at a Parallel-to-Single converter 438. Additional information provided in band edge sub-carriers of an OFDM symbol can pertain to a common communication link to which information in the inbound sub-carriers 432 pertains. However, additional information provided in band edge sub-carriers 434 can pertain to a different communication link. Therefore, band edge sub-carriers can be bundled in distinct output 440 by a Parallel-to-Single converter.

One or more communication links for a Device-to-Device (D2D) communication application and/or a Machine to Machine (M2M) communication application can provide illustrative, non-limiting examples of such additional communication links that can be established in band edge subcarriers. OOB leakage can be controlled to free up band edge sub-carriers for such communication links, and/or to augment information in a common communication link by approaches alternative to, or combined with, the application of a tapered window. For example, OOB leakage can be controlled with sub-carrier specific reductions in power, as discussed below.

Figure 5:
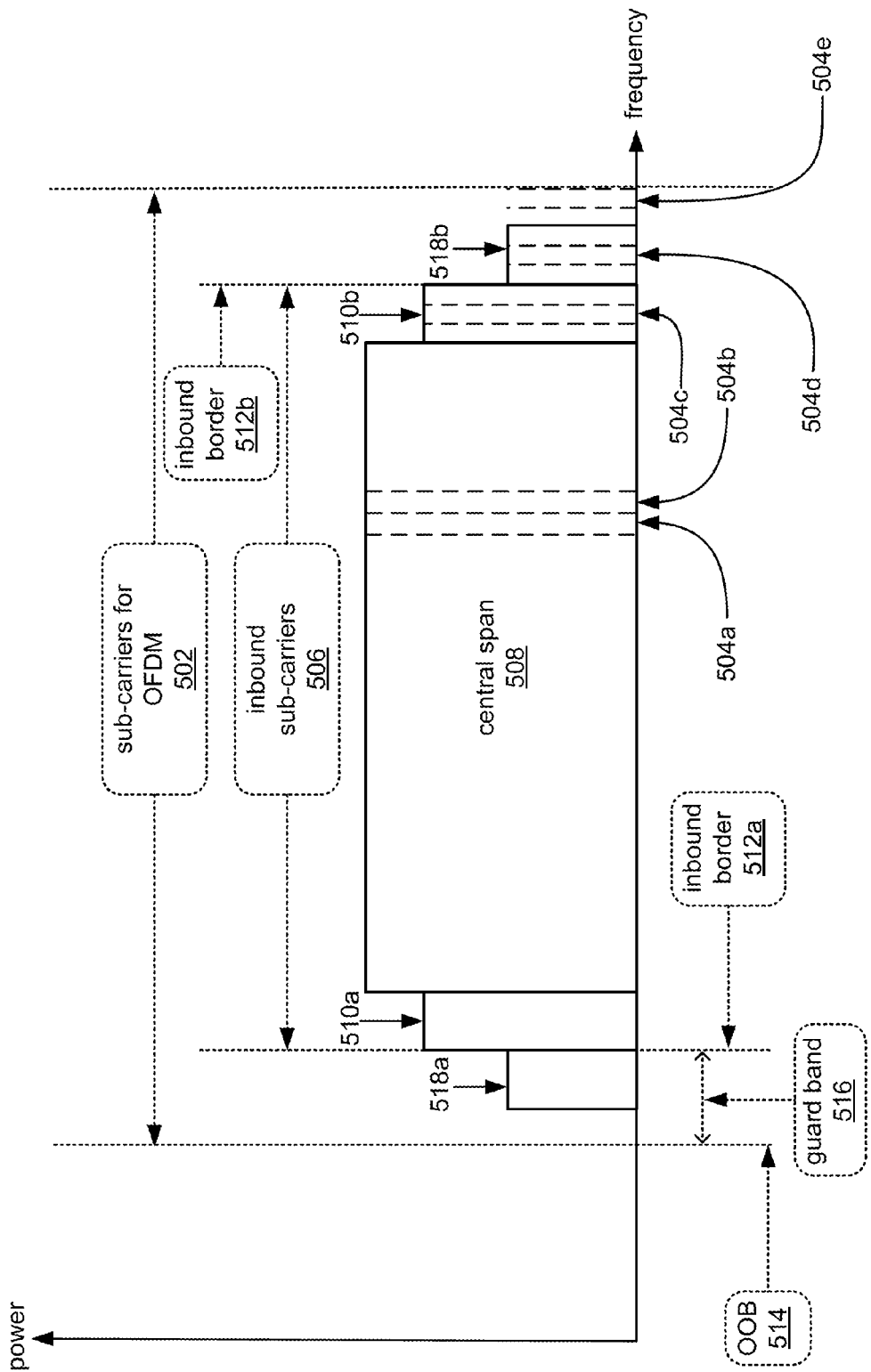
FIG. 5 is a block diagram illustrating the transmission power of an OFDM symbol with respect to frequency, where power is reduced at the OFDM band edges, consistent with various examples.

FIG. 5 depicts maximum powers at which a span, with respect to frequency, of sub-carriers reserved for an OFDM symbol 502 can be scheduled for transmission, consistent with various examples. Representative sub-carriers 504a-504e are depicted in FIG. 5 to represent additional sub-carriers present in the span of sub-carriers reserved for the OFDM symbol, which as discussed above, can vary in number. The span of sub-carriers can be subdivided into multiple different sub-spans with respect to frequency, with different maximum transmission powers associated with different sub-spans.

For example, the span of sub-carriers pertaining to the OFDM symbol can include a span of inbound sub-carriers 506. The span of inbound sub-carriers 506 can correspond to sub-carriers on which data can be transmitted under traditional approaches that employ guard bands to avoid OOB leakage. A central span 508 within the inbound sub-carriers can define a first span.

One or more transition spans 510a, 510b can be disposed within the inbound span of sub-carriers, but can abut an inbound border 512a, 512b at either a low end or a high end frequency of the inbound span. Therefore, a transition span can flank the central span at frequencies immediately above or below those in the central span. Also abutting, in some examples, such as the one depicted in FIG. 5, one or both inbound borders, but on a side opposite a transition span, one or more edge spans 518a, 518b can be disposed.

An edge span 518a, 518b can be disposed within and/or occupy any region near an edge of a span of sub-carriers for an OFDM symbol, whether the edge is near an OOB region 514 at the high end or the low end of the spectrum. In some examples, an edge span can span a region, or a portion thereof, that would pertain to a guard band 516 in traditional approaches to controlling OOB leakage. In some examples, such as the one depicted in FIG. 5, a portion of this traditional guard band region can be reserved for sub-carriers with substantially zero transmission power. As can be appreciated by the one or more representative sub-carriers 504a-504e in each sub-span, any number of sub-carriers can be found in each of these sub-spans.

Sub-carriers 504a, 504b within the central span 508 can be transmitted at maximum powers within a first power range. One or more sub-carriers 504c in one or more transition spans 510a, 510b can be transmitted at maximum powers within a second power range. The second transition power range, as depicted in FIG. 5, can be defined for powers lower than the first transition span. Since the second power range is lower than the first power range, spectral leakage from sub-carriers in the transition span will also be lower.

Since spectral leakage from sub-carriers 504c within one or more transition spans 518a, 518b can be lower, especially at OOB frequencies, additional sub-carriers near one or more OFDM symbol edge can become available to transmit data within a defined third power range. As with the relationship between the first two power ranges, the third transition power range, as depicted in FIG. 5, can be defined for powers lower than the second transition span. Therefore, spectral leakage from sub-carriers in an edge span will be even lower, and can similarly drop off to acceptable levels for OOB frequencies, even though those frequencies can be even closer with respect to OOB frequencies and can combine with reduced spectral leakage from one or more transition spans 510a, 510b.

The number of sub-carriers in one or more transition spans 510a, 510b and/or one or more edge spans 518a, 518b and/or the corresponding second and third power ranges can be set to assure that OOB leakage does not exceed a permissibility threshold. In some examples, one or more transition spans and/or one or more edge spans 518a, 518b can comprise multiple sub-spans. In such examples, the second power range and/or the third power range can comprise multiple different sub-power levels, wherein different sub-power levels can correspond to different sub-spans. Power levels, in certain examples, can be assigned within one or more transition spans 510a, 510b and/or one or more edge spans 518a, 518b so that a total power arrived at by integrating over all frequencies pertaining to the OFDM symbol remains substantially unchanged from an amount of power applied in a traditional OFDMA symbol.

As stated, information provided in sub-carriers of an edge span 518a, 518c can pertain to a communication link shared with other sub-carriers, for example, DownLink and/or UpLink communications carried by sub-carriers in the inbound sub-carriers 506, or can pertain to different communication links, such as those for D2D and/or M2M communication applications. Where one or more power levels are reduced for transmission of the additional information on edge sub-carriers, a distance of transmission can be an important factor in determining the reliability of the corresponding transmission. Therefore, a transmission distance can be predetermined for such a power level. The transmission distance can be set at a distance that can insure a reduced transmission power for the additional information can meet communication standards of a given receiver for various potential channel qualities. When a given receiver is determined to be within the transmission distance, information specific to the given receiver can be provisioned for inclusion in an edge span.

Figure 6:
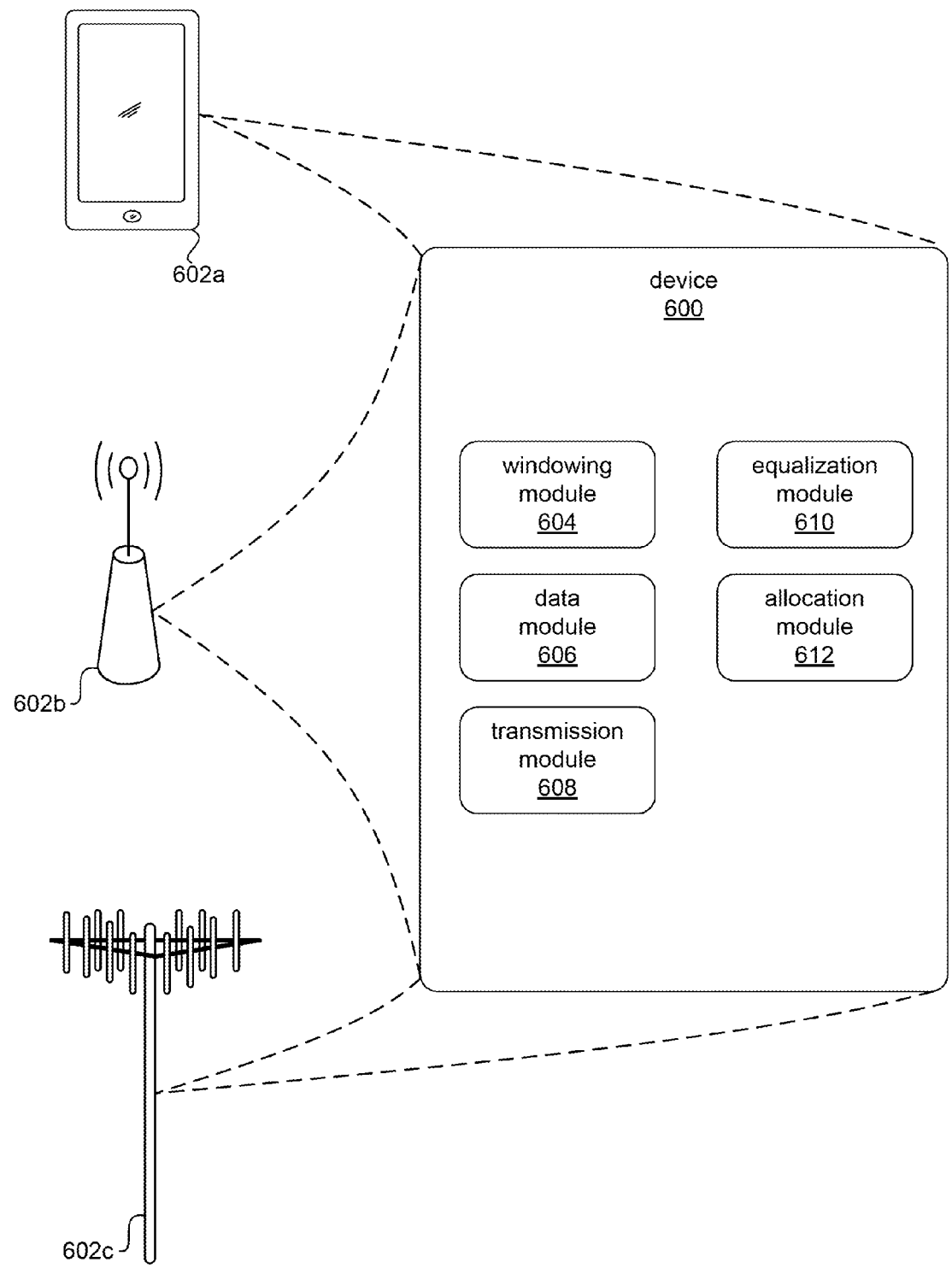
FIG. 6 is a block diagram illustrating a device, operating at a transmitter, for sending information at a band edge within an OFDM, consistent with various examples.

FIG. 6 depicts a device 600, operating at a transmitter 602a-602c, which can be located in one of an eNodeB and a UE, for sending information at a band edge within an OFDM, consistent with various examples. The transmitter can be a transmission point or a mobile device. In embodiments consistent with the 3GPP LTE standards, the transmitter can be located in any of a UE 602a, an eNodeB 602c, a Macro-eNodeB (MCN) eNodeB, or a Low Power Node 602b. The device 600 can comprise a windowing module 604, a data module 606, a transmission module 608, an equalization module 610 and/or an allocation module 612.

The windowing module 604 can be configured to apply a tapering window to at least a portion of an OFDM symbol. The tapering window can be selected to reduce OOB spectral leakage. Such spectral leakage can be reduced in order to enable placement of information at the band edge of the OFDM symbol. The data module 606 can be configured to provision the information to the OFDM symbol at the band edge. The transmission module 608 can be configured to transmit the OFDM symbol with the additional information in the band edge after application of the tapering window.

For some examples, the data module 606 can provision the information that pertains to one or more communication links. Such communication links can comprise a link between an eNodeB and a UE and/or between a first and second UE. In addition, the data module 606 can provision information that pertains to a communication link for a D2D communication application and/or an M2M communication application. Additionally, in some examples, the windowing module 604 can apply the tapering window over a windowing interval substantially equal to the inverse of a sub-carrier bandwidth for a sub-carrier within the OFDM symbol to preserve orthogonality between sub-carriers. Additionally, the windowing module can apply the tapering window to the at least a portion of the OFDM symbol after an Inverse Discrete Fourier Transform (IDFT) has been applied to data within the OFDM symbol, but before a CP is added to the OFDM symbol.

In some examples, the device 600 can further comprise an equalization module. The equalization module 610 can be configured to select ICI coefficient information corresponding to the tapering window applied at the transmitter. The ICI coefficient information can be known a-priori for the tapering window selected. Additionally, the equalization module can provision the ICI coefficient to the transmission module 606 for transmission to a receiving device. The ICI coefficient information can be transmitted to enable the receiving device to equalize a signal associated with the OFDM symbol by removing ICI in adjacent sub-carriers within the OFDM symbol.

Certain embodiments can further comprise an allocation module 612. The allocation module can be configured to increase a distance between sub-carriers carrying data within the OFDM symbol. The distance can be increased by the allocation module by an amount to offset an increase in a first main-lobe size corresponding to a frequency response of the tapering window relative to the first main-lobe size corresponding to a frequency response of a rectangular window. The distance can be created by the allocation module by including a number of sub-carriers not carrying data between sub-carriers that can be allocated for carrying data.

Figure 7:
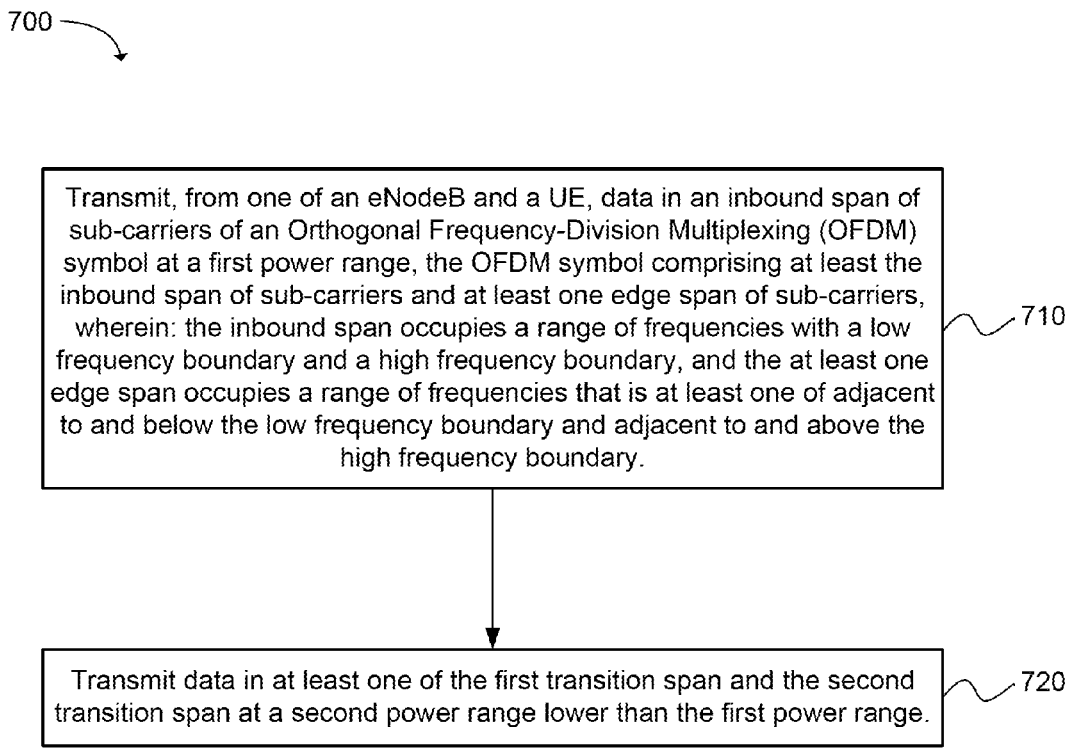
FIG. 7 is a flowchart depicting a process for utilizing bandwidth at an OFDM symbol band edge, consistent with various examples.

FIG. 7 depicts a flowchart of a method 700 for utilizing bandwidth at an OFDM symbol band edge. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 700 can comprise transmitting 710, from a transmitter, data in an inbound span of sub-carriers of an OFDM symbol at a first power range. The transmitter can be located in one of an eNodeB and a UE. The OFDM symbol can comprise at least the inbound span of sub-carriers and at least one edge span of sub-carriers. The inbound span can occupy a range of frequencies with a low frequency boundary and a high frequency boundary. The at least one edge span can occupy a range of frequencies that is at least one of adjacent to and below the low frequency boundary and adjacent to and above the high frequency boundary. The method 700 can further comprise transmitting 720 data in a portion of the at least one edge span at a second power range that is lower than the first power range of the inbound span. In some examples, a remaining portion of the at least one edge span can receive substantially no transmission power.

Transmitting 710 the data in the inbound span of sub-carriers can further comprise determining, for a given power level in the second power range, a number of sub-carriers in the at least one edge span to reduce OOB spectral leakage to be below a permissibility threshold. In some examples, transmitting data in the inbound span of sub-carriers can further comprise determining, for a given number of sub-carriers, a power level in the second power range for the at least one edge span to reduce OOB spectral leakage to be below a permissibility threshold. In certain examples, transmitting data in the portion of the at least one edge span can further comprise transmitting data in multiple sub-spans at multiple different sub-power levels. In such examples, the second power range can comprise the multiple different sub-power levels. Also, the at least one edge span can comprise the multiple sub-spans.

Some examples can further comprise transmitting 720 data in at least one transition span of sub-carriers at a low sub-power range within the first power range that is higher than the second power range and lower than a high power range within the first power range of the inbound span. In such examples, the inbound span can comprise a central span of sub-carriers transmitted at the high sub-power range and the at least one transition span of sub-carriers transmitted at the low sub-power range. The at least one transition span can occupy a range of frequencies that is below frequencies occupied by the central span and above the low frequency boundary. Additionally, or in the alternative, the at least one transition span can occupy a range of frequencies that is above the frequencies occupied by the central span and below the high frequency boundary.

Such examples can further comprise determining a number of sub-carriers in the at least one transition span for a given power level within the low sub-power range, within the first power range, to reduce spectral leakage from the inbound span into an OOB region not designated for the OFDM symbol below an acceptability threshold. Similarly, such examples can further comprise determining a power level within the low sub-power range, within the first power range, for a given number of sub-carriers in the at least one transition span to reduce spectral leakage from the inbound span into an OOB region not designated for the OFDM symbol below an acceptability threshold. Furthermore, transmitting data in the at least one transition span can further comprises transmitting data in multiple sub-transition-spans at multiple different sub-power levels. In such examples, the low sub-power range of the first power range can comprise the multiple different sub-power levels. Also, the at least one transition span can comprise the multiple sub-transition-spans.

The method 700 can further comprise assigning power levels within the at least one transition span and the at least one edge span. These power levels can be assigned so that a total power arrived at by integrating over all frequencies pertaining to the OFDM symbol remains substantially unchanged relative to a traditional scenario. The traditional scenario can obtain where transmission power is constant across the inbound span and no power is allocated to the at least one edge span. An additional condition can be imposed on the traditional scenario that a value of the transmission power for the scenario is determined by an existing, legacy 3GPP LTE implementation as set forth in at least one of Release 8, Release 9, and Release 10.

Also, the method 700 can further comprise determining a transmission distance. The transmission distance can be set to insure that a reduced transmission power for the second power range for the at least one edge span of the OFDM symbol can meet communication standards of a given receiver for a distance below the transmission distance. Such examples can further comprise determining that the given receiver is located at a distance below the transmission distance. Additionally, such examples can comprise provisioning information specific to the given receiver for inclusion in the at least one edge span of the OFDM symbol.

Figure 8:
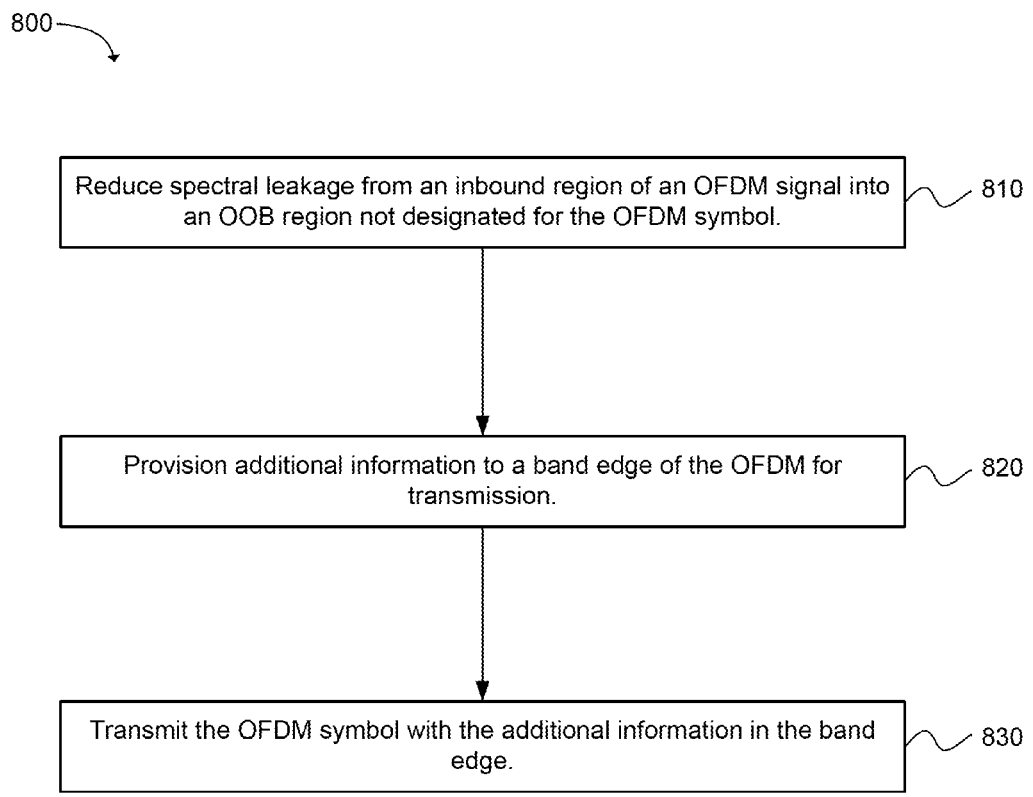
FIG. 8 is a flowchart depicting a process for utilizing an OFDM symbol band edge, consistent with various examples.

FIG. 8 depicts a flowchart of a method 800 for utilizing an OFDM band edge. The method can, but need not necessarily, be embedded in a computer program product comprising a non-transitory computer usable medium. The computer readable medium can have a computer readable program code embodied therein. The computer readable program code can be adapted to be executed to implement instructions for the method. Also, the method can be implemented at a transmitter, located in one of an eNodeB and a UE.

The method 800 can comprise reducing 810, spectral leakage from an inbound region of an OFDM signal into an OOB region not designated for the OFDM symbol. Additionally, the method can comprise provisioning 820 additional information to the band edge of the OFDM for transmission. The OFDM symbol can also be transmitted 830 with the additional information in the band edge.

In some examples, reducing spectral leakage can further comprise applying a tapering window to the OFDM symbol. Also, in some examples, reducing spectral leakage can further comprise reducing transmission power for a set of adjacent sub-carriers within the OFDM symbol at an edge region within an inbound region of the OFDM symbol. In such examples, the edge region can occupy frequencies adjacent to those occupied by the band edge. Similarly, reducing spectral leakage can further comprise reducing transmission power for a set of adjacent sub-carriers within the OFDM symbol at an edge region within an inbound region of the OFDM symbol. The edge region can occupy frequencies adjacent to those occupied by the band edge.

In certain examples, the method 800 can further comprise transmitting ICI coefficient information corresponding to the tapering window. The tapering window can be transmitted to enable a receiving device to equalize a signal associated with the OFDM symbol by removing ICI in adjacent sub-carriers within the OFDM symbol by applying the ICI coefficient information. Also, some examples can further comprise screening additional information to be provisioned to the band edge. The screening can be based on a distance over which the additional information is determined to be transmitted. The additional information can be selected for the band edge if the distance is less than a distance threshold set to insure communication of information in the band edge.

Figure 9:
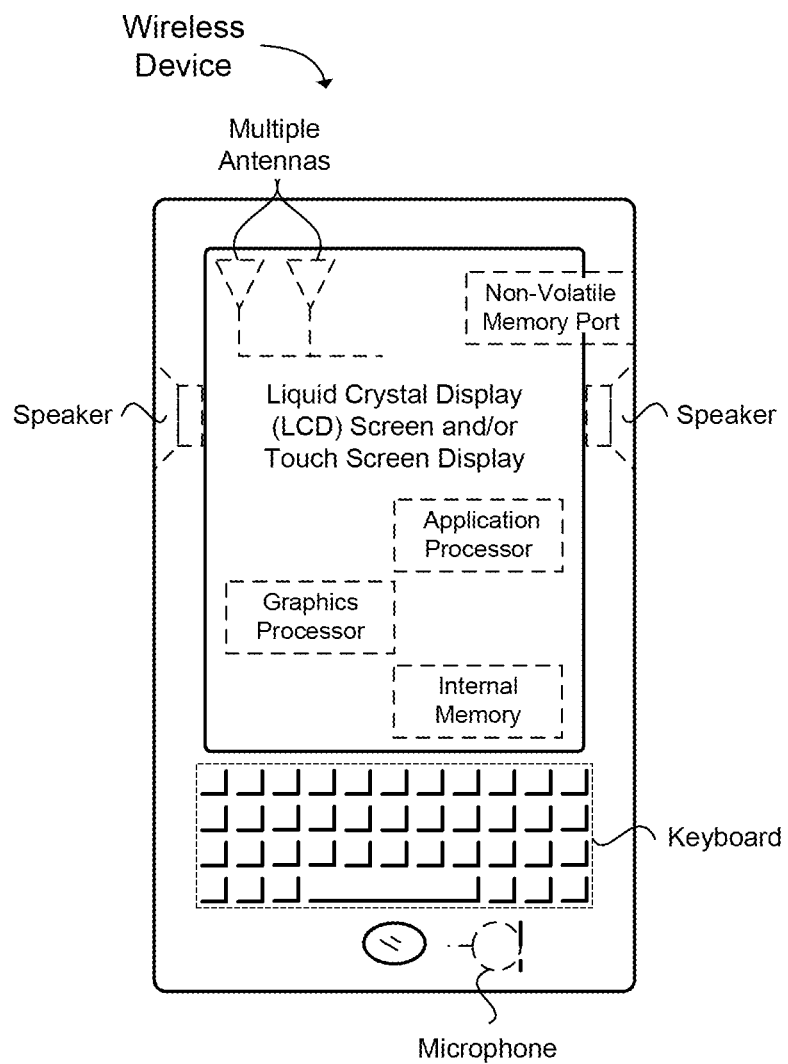
FIG. 9 is a block diagram of a UE in accordance with another example.

FIG. 9 provides an example illustration of a mobile device, such as UE, an MS, a mobile wireless mobile device, a mobile communication device, a tablet, a handset, or other type of mobile wireless mobile device. The mobile device can include one or more antennas configured to communicate with a BS, an eNodeB, or other type of WWAN transmission point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a Wireless Local Area Network (WLAN), a Wireless Personal Area Network (WPAN), and/or a WWAN.

FIG. 9 also provides an illustration of a microphone and one or more speakers that can be used for audio input and output from the mobile device. The display screen may be a Liquid Crystal Display (LCD) screen, or other type of display screen such as an Organic Light Emitting Diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. Non-volatile memory can include a Solid State Drive (SSD), Flash Random Access Memory (RAM), and so forth. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, Solid State Drives (SSD), flash RAM, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device for sending, from a transmitter located in one of an evolved NodeB (eNodeB) and a User Equipment (UE), information at a band edge of an Orthogonal Frequency-Division Multiplexing (OFDM) symbol, comprising:
    a windowing module configured to apply a tapering window to at least a part of an OFDM symbol, the tapering window selected to reduce Out Of Band (OOB) spectral leakage in order to enable placement of information at the band edge of the OFDM symbol;
    a data module configured to provision the information to the OFDM symbol at the band edge;
    a transmission module, the transmission module configured to transmit the OFDM symbol with the additional information in the band edge after application of the tapering window;
    an equalization module, the equalization module configured to:
        select Inter-Carrier Interference (ICI) coefficient information corresponding to the tapering window applied at the transmitter, wherein the ICI coefficient information is known a priori for the tapering window selected; and
        provision the ICI coefficient information to the transmission module for transmission to a receiving device to enable the receiving device to equalize a signal associated with the OFDM symbol with the ICI coefficient information.

2. The device of claim 1, wherein the windowing module applies the tapering window over a windowing interval substantially equal to an inverse of a sub-carrier bandwidth for a sub-carrier within the OFDM symbol to preserve orthogonality between sub-carriers.

3. The device of claim 1, wherein the windowing module applies the tapering window to the at least a part of the OFDM symbol after an Inverse Discrete Fourier Transform (IDFT) has been applied to data within the OFDM symbol, but before a Cyclic Prefix (CP) is added to the OFDM symbol.

4. The device of claim 1, further comprising an allocation module configured to increase a distance between sub-carriers carrying data within the OFDM symbol by an amount to offset an increase in a first main-lobe size corresponding to the tapering window relative to the first main-lobe size corresponding to a rectangular window, the distance created by including a number of sub-carriers not carrying data between sub-carriers carrying data.

5. The device of claim 1, wherein the data module provisions the information for at least one communication link that pertains to at least one of a Device-to-Device (D2D) communication application and a Machine to Machine (M2M) communication application.

6. A method for utilizing bandwidth at an Orthogonal Frequency-Division Multiplexing (OFDM) symbol band edge, comprising:
    transmitting, from a transmitter located in one of an evolved NodeB (eNodeB) and a User Equpiment (UE), data in an inbound span of sub-carriers of an Orthogonal Frequency-Division Multiplexing (OFDM) symbol at a first power range, the OFDM symbol comprising at least the inbound span of sub-carriers and at least one edge span of sub-carriers, wherein: the inbound span occupies a range of frequencies with a low frequency boundary and a high frequency boundary, and the at least one edge span occupies a range of frequencies that is at least one of adjacent to and below the low frequency boundary and adjacent to and above the high frequency boundary; and
    transmitting data in a portion of the at least one edge span at a second power range that is lower than the first power range of the inbound span;
    transmitting data in at least one transition span of sub-carriers at a low sub-power range within the first power range that is higher than the second power range and lower than a high power range within the first power range of the inbound span, wherein;
    the inbound span comprises a central span of sub-carriers transmitted at the high sub-power range and the at least one transition span of sub-carriers transmitted at the low sub-power range; and
    the at least one transition span occupies a range of frequencies that is at least one of;
        below frequencies occupied by the central span and above the low frequency boundary, and
        above the frequencies occupied by the central span and below the high frequency boundary.

7. The method of claim 6, further comprising determining, for a given power level in the second power range, a number of sub-carriers in the at least one edge span to reduce Out-Of-Band (OOB) spectral leakage to be below a permissibility threshold.

8. The method of claim 6, further comprising determining, for a given number of sub-carriers, a power level in the second power range for the at least one edge span to reduce Out-Of-Band (OOB) spectral leakage to be below a permissibility threshold.

9. The method of claim 6, wherein transmitting data in the portion of the at least one edge span further comprises transmitting data in multiple sub-spans at multiple different sub-power levels, wherein:
the second power range comprises the multiple different sub-power levels; and
the at least one edge span comprises the multiple sub-spans.

10. The method of claim 6, further comprising determining a number of sub-carriers in the at least one transition span for a given power level within the low sub-power range within the first power range to reduce spectral leakage from the inbound span into an Out-Of-Band (OOB) region not designated for the OFDM symbol below an acceptability threshold.

11. The method of claim 6, further comprising determining a power level within the low sub-power range within the first power range for a given number of sub-carriers in the at least one transition span to reduce spectral leakage from the inbound span into an Out-Of-Band (OOB) region not designated for the OFDM symbol below an acceptability threshold.

12. The method of claim 6, wherein transmitting data in the at least one transition span further comprises transmitting data in multiple sub-transition-spans at multiple different sub-power levels, wherein:
the low sub-power range of the first power range comprises the multiple different sub-power levels; and,
the at least one transition span comprises the multiple sub-transition-spans.

13. The method of claim 6, wherein a remaining portion of the at least one edge span receives substantially no transmission power.

14. The method of claim 6, further comprising assigning power levels within the at least one transition span and the at least one edge span so that a total power arrived at by integrating over all frequencies pertaining to the OFDM symbol remains substantially unchanged relative to a scenario where transmission power is constant across the inbound span and no power is allocated to the at least one edge span, where a value of the transmission power for the scenario is determined by an existing, legacy Third Generation Partnership Project (3GPP) Long Term Evolution (LTE) implementation as set forth in at least one of Release 8, Release 9, and Release 10.

15. The method of claim 6, further comprising determining a transmission distance, the transmission distance set to insure a reduced transmission power for the second power range for the at least one edge span of the OFDM symbol can meet communication standards of a given receiver for a distance below the transmission distance.

16. The method of claim 15, further comprising:
determining the given receiver is located at a distance below the transmission distance; and
provisioning information specific to the given receiver for inclusion in the at least one edge span of the OFDM symbol.

17. A transmitter, located in one of an evolved NodeB (eNodeB) and a User Equpiment (UE), operable to utilize an Orthogonal Frequency-Division Multiplexing (OFDM) band edge, comprising:
reducing spectral leakage from an inbound region of an Orthogonal Frequency-Division Multiplexing (OFDM) into an Out-Of-Band (OOB) region not designated for the OFDM symbol;
applying a tapering window to the OFDM symbol;
transmitting Inter-Carrier Interference (ICI) coefficient information corresponding to the tapering window to enable a receiving device to equalize a signal associated with the OFDM symbol by removing ICI in adjacent sub-carriers within the OFDM symbol by applying the ICI coefficient information;
provisioning additional information to a band edge of the OFDM for transmission; and
transmitting the OFDM symbol with the additional information in the band edge.

18. The computer program product of claim 17, wherein reducing spectral leakage further comprises reducing transmission power for a set of adjacent sub-carriers within the OFDM symbol at an edge region within an inbound region of the OFDM symbol, wherein the edge region occupies frequencies adjacent to those occupied by the band edge.

19. The computer program product of claim 17, further comprising screening additional information to be provisioned to the band edge based on a distance over which the additional information is determined to be transmitted, wherein the additional information is selected for the band edge if the distance is less than a distance threshold set to insure communication of information in the band edge.

* * * * *

UNITED STATES PATENT AND TRADEMARK OFFICE
CERTIFICATE OF CORRECTION

PATENT NO. : 8,873,655 B2  
APPLICATION NO. : 13/738928  
DATED : October 28, 2014  
INVENTOR(S) : Bhaskar Rao et al.

It is certified that error appears in the above-identified patent and that said Letters Patent is hereby corrected as shown below:

In the Claims

In column 17, line 42, In Claim 1, delete "Equpiment" and insert -- Equipment --, therefor.

In column 17, line 61, In Claim 1, delete "a priori" and insert -- a-priori --, therefor.

In column 17, line 66, In Claim 1, after "symbol" insert -- by removing ICI in adjacent sub-carriers within the OFDM symbol --.

In column 18, line 28, In Claim 6, delete "Equpiment" and insert -- Equipment --, therefor.

In column 18, line 47, In Claim 6, delete "wherein;" and insert -- wherein: --, therefor.

In column 18, line 53, In Claim 6, delete "of;" and insert -- of: --, therefor.

In column 20, line 13, In Claim 17, delete "Equpiment" and insert -- Equipment --, therefor.

Signed and Sealed this  
Third Day of March, 2015

Michelle K. Lee  
*Deputy Director of the United States Patent and Trademark Office*